US008767597B2

(12) United States Patent
Nakao et al.

(10) Patent No.: US 8,767,597 B2
(45) Date of Patent: Jul. 1, 2014

(54) WIRELESS COMMUNICATION APPARATUS

(75) Inventors: Akihiro Nakao, Tokyo (JP); Eiji Miyagaki, Musashino (JP); Ping Du, Yokohama (JP)

(73) Assignees: The University of Tokyo, Tokyo (JP); National Institute of Information and Communications Technology, Tokyo (JP)

( * ) Notice: Subject to any disclaimer, the term of this patent is extended or adjusted under 35 U.S.C. 154(b) by 166 days.

(21) Appl. No.: 13/299,952

(22) Filed: Nov. 18, 2011

(65) Prior Publication Data

US 2013/0128784 A1  May 23, 2013

(51) Int. Cl.
*H04B 7/00* (2006.01)
(52) U.S. Cl.
USPC .......................................................... 370/310
(58) Field of Classification Search
None
See application file for complete search history.

(56) References Cited

U.S. PATENT DOCUMENTS

| | | | | |
|---|---|---|---|---|
| 2005/0163096 | A1* | 7/2005 | Momona | 370/349 |
| 2005/0177648 | A1* | 8/2005 | Toyohara et al. | 710/1 |
| 2006/0046730 | A1* | 3/2006 | Briancon et al. | 455/446 |
| 2006/0126587 | A1* | 6/2006 | Tsubota | 370/338 |
| 2006/0165103 | A1* | 7/2006 | Trudeau et al. | 370/401 |
| 2007/0171904 | A1* | 7/2007 | Tchigevsky | 370/389 |
| 2007/0195725 | A1* | 8/2007 | Iino et al. | 370/328 |
| 2007/0234402 | A1* | 10/2007 | Khosravi et al. | 726/2 |
| 2009/0059878 | A1* | 3/2009 | Tamura | 370/338 |
| 2011/0013608 | A1* | 1/2011 | Lee et al. | 370/338 |
| 2011/0145418 | A1* | 6/2011 | Pratt et al. | 709/227 |
| 2012/0184242 | A1* | 7/2012 | Li et al. | 455/406 |

OTHER PUBLICATIONS

Nakao et al., "CoreLab: An Emerging Network Testbed Employing Hosted Virtual Machine Monitor," *ROADS*, 2008, University Carlos III and IMEDA Networks, Spain, (6 pages) <http://www.corelab.jp>.
Hiertz et al., "IEEE 802.11s: The WLAN Mesh Standard," *IEEE Wireless Communications*, Feb. 2010, pp. 104-111, <http://ieeexplore.ieee.org>.
Amir et al., "The SMesh Wireless Mesh Network," ACM, Sep. 2010, pp. 1-42, <http://www.cndsjhu.edu>.
Pu et al., "BeaconCast: Practical Information Dissemination via WiFi beacons," IEICE Society Conference, 2011, (2 pages).
Nakao et al., "WiVi [wi:vi:] Wi-Fi Network Virtualization Infrastructure," IEICE NwGN Tech Report, 2010, pp. 1-28, Kyoto.

* cited by examiner

*Primary Examiner* — Otis L Thompson, Jr.
(74) *Attorney, Agent, or Firm* — Oliff PLC (57) ABSTRACT

A wireless communication apparatus includes a wireless communication device for multiplexing communication channels according to a predetermined method for carrying out wireless communication with a terminal, and carrying out communication with the terminal; and a control device for providing a plurality of program executing environments corresponding to the respective communication channels to operate in parallel or a in multitask manner, wherein, in each of the program executing environment, a process for providing a virtual wireless communication device interface corresponding to a corresponding communication channel and for carrying out Media Access control for communication via the virtual wireless communication device interface is executed, and the control device causes only the program being executed in the program executing environment to carry out communication via a virtual wireless communication device interface provided by the program being executing in the program executing environment.

3 Claims, 4 Drawing Sheets

WIRELESS COMMUNICATION APPARATUS

BACKGROUND OF THE INVENTION

1. Field of the Invention

The present invention relates to a apparatus for wireless communication, and more particularly to multiplexing in communication.

2. Description of Prior Art

Development of an overlay network in the Internet by utilizing a technique for virtualizing a wired network has been performed. As an example of such a network, PlanetLab (http://www.planet-lab.org), CoreLab (http://www-.corelab.jp), and so forth are available.

Conventionally, in construction of an overlay network in a wired network, Virtual Machine (VM) for realizing a virtual node is operated on a physical node that constitutes the overlay network. In general, a physical node is hardware that provides execution environment for switching and forwarding data packets. A virtual node is a logical instance of such execution environments realized on top of a single physical node. Further, use of a recently widely used virtual technique makes it possible to have two or more VM's to operate on a single physical node.

In such a wired network, a physical communication path to a communication party is ensured by means of hardware such as a network card. Accordingly, it is usually not necessary to make a process corresponding to a so-called data link layer in the OSI reference model, such as ensuring a communication path, control of competition, and so forth, different for every individual communication means (i.e., every network slice) to be overlaid.

Meanwhile, in a wireless network, such as a wireless LAN, there can be caused interference of electromagnetic waves, a hidden terminal problem, and so forth. Therefore, in a wireless network, there may be a case in which ensuring a physical communication path, control of competition, and so forth should be performed differently for every virtual node. Consequently, it is not usually possible to apply technique for a wired network intact to a wireless LAN.

SUMMARY OF THE INVENTION

According to one aspect of the present invention, there is provided a wireless communication apparatus comprising a wireless communication device for multiplexing communication channels according to a predetermined method for carrying out wireless communication with a terminal, and carrying out communication with the terminal; and a control device for providing a plurality of program executing environments corresponding to the respective communication channels to operate in parallel or a in multitask manner, wherein, in each of the program executing environment, a process for providing a virtual wireless communication device interface corresponding to a corresponding communication channel and for carrying out Media Access control for communication via the virtual wireless communication device interface is executed, and the control device causes only the program being executed in the program executing environment to carry out communication via a virtual wireless communication device interface provided by the program being executing in the program executing environment.

DESCRIPTION OF THE PREFERRED EMBODIMENT(S)

Figure 1:
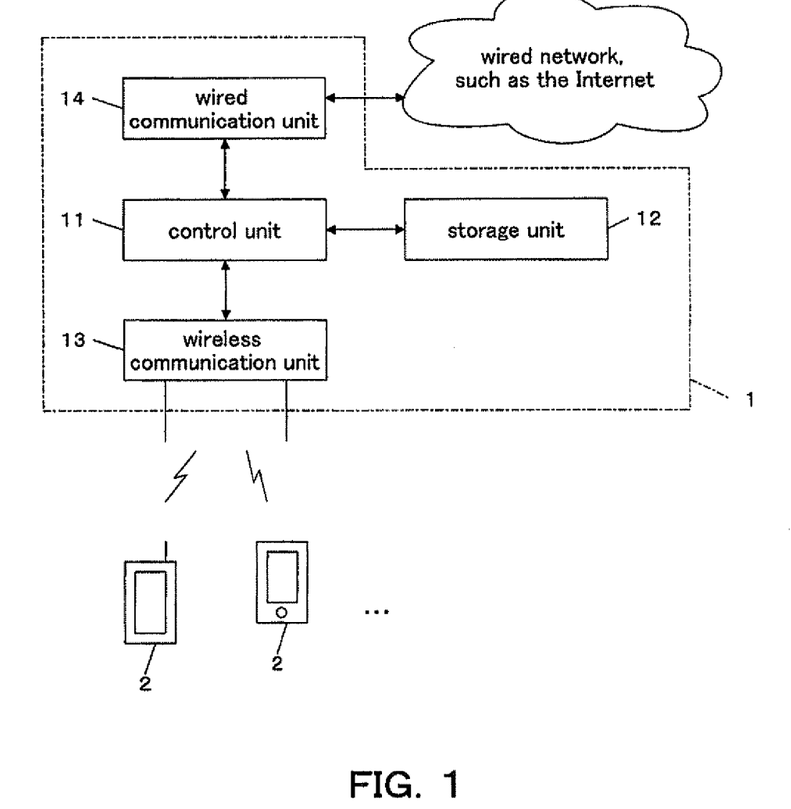
FIG. 1 is a schematic diagram showing an example structure and example connection of a wireless communication apparatus according to an embodiment of the present invention.

As shown in FIG. 1, a wireless communication apparatus 1 according to this embodiment comprises a control unit 11, a storage unit 12, a wireless communication unit 13, and a wired communication unit 14. The wireless communication apparatus 1 carries out wireless communication with various terminals 2.

The control unit 11 of the wireless communication apparatus 1 is a program control device, such as a CPU, and operates according to a program stored in the storage unit 12.

According to one aspect of this embodiment, the control unit 11 carries out a process of a host operating system (host OS) that can have two or more program executing environments operate in parallel or in a multitasking manner. That is, conceptually, the control unit 11 divides its own CPU resources, storage resources, network bandwidth resources, and so forth, to allocate to two or more program executing environments. In each program executing environment, another operating system (a guest OS) may operate, and two or more tasks may be carried out on the guest OS in a time dividing manner or in parallel.

In an example of this embodiment, the control unit 11 has Linux operating as a host OS and a guest OS, and employs Linux Containers, which is one type of resource containers, as a method for forming two or more virtual program executing environments on the host OS.

Figure 2:
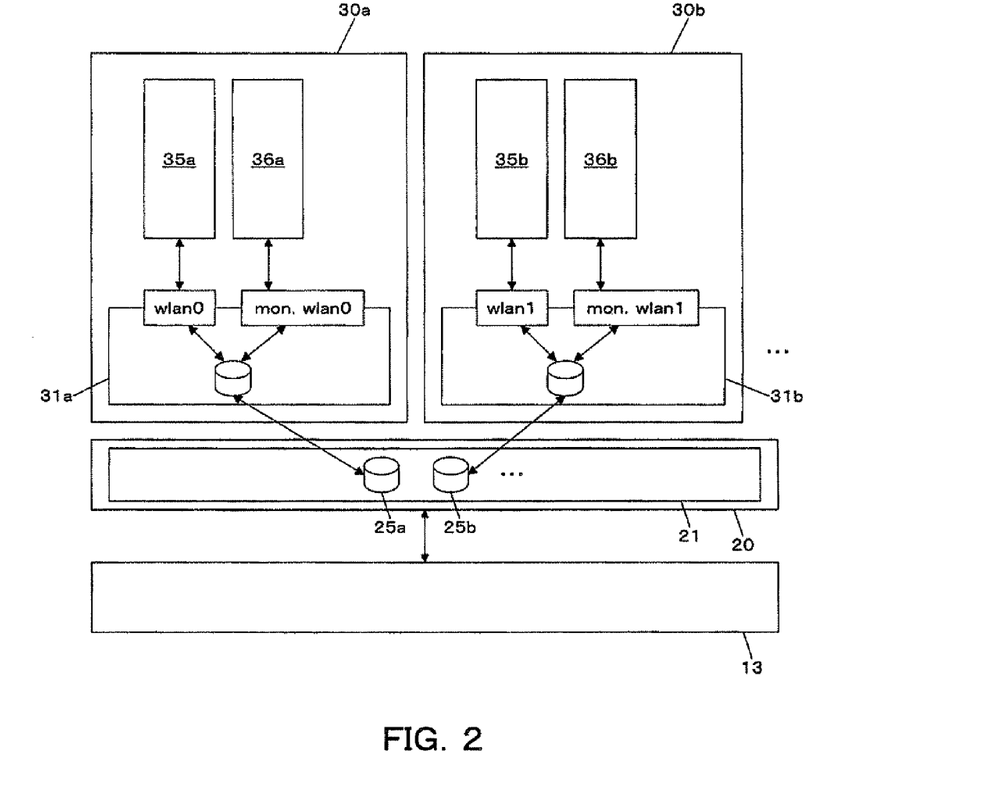
FIG. 2 is a functional block diagram related to one example of a wireless communication apparatus according to an embodiment of the present invention.

As shown in FIG. 2, the control unit 11 functionally comprises a host OS 20 and a plurality of program executing environments 30 formed corresponding to respective communication channels. The host OS 20 includes a device driver 21. In each program executing environment 30, a guest OS 31 is operating, and further, a data process module 35 and a communication control module 36 are executed as user programs operating on the guest OS 31. When Linux Containers are used as a method for forming a program executing environment, each program executing environment 30 is realized as an independent Linux Containers (LXC) guest environment on the host OS 20.

The guest OS 31 has a protocol stack for general wireless communication. Note that the protocol stack of the guest OS 31 includes one or more modules that provide at least a function corresponding to a data link layer (a module corresponding to a MAC (Media Access Control) sub-layer) and a function corresponding to a layer superior to the data link layer in the OSI reference model. As one example, in the case of Linux, nl80211, mac80211, ath9k, and so forth, are included.

At the time of initialization, the guest OS 31 requests the host OS 20 to open a new communication channel. Then, when a communication channel is opened, the guest OS 31 carries out a process for establishing a physical communication path for the communication channel and a process of contention control for the same. Further, the guest OS 31 exchanges data to be sent and received with the data process module 35, which is a user program, via the corresponding communication channel (hereinafter, the communication channel which corresponds to a guest OS 31 is simply called corresponding communication channel). Still further, the guest OS 31 sets at least one parameter (to be described later) for communication via the corresponding communication channel, according to an instruction input from the communication control module 36.

As one example, the guest OS 31 provides the user program with an interface of a virtual wireless communication device for the corresponding communication channel. Specifically, in the case of Linux, an interface of a wireless communication device is virtualized as multiple virtual devices identified by wlanp and mon.wlanp (p at the end is a numerical value beginning with 0). The guest OS 31 provides the user program side with such virtual devices as wireless communication device interfaces (wlanp, mon.wlanp, and so forth) for the communication channel.

The data process module 35 processes information to be transmitted and received via the communication channel corresponding to the program executing environment 30 where the data process module 35 is being executed, by following pre-programmed instruction. The content of the process may differ for every program executing environment 30. Specifically, supposing that the data process module 35 operates on the Linux, the data process module 35 accesses wlanp similar to a general program for processing communication data. In the above, the guest OS 31 treats writing into wlan0 as sending data via the corresponding communication channel, and reading from wlan0 as reading of data received via the corresponding communication channel.

In communication via the corresponding communication channel, the communication control module 36 sets at least one communication parameter. The communication parameter here includes identification information (ssid or the like in the case where the corresponding communication channel operates as an access point), a key length for broadcasting, presence or absence of an encryption process, and an encryption parameter (the type or the like of encryption process). The communication control module 36 can be, e.g., hostapd in the Linux or the like without any modification. Supposing hostapd is used, as in this example, the hostapd operating as the communication control module 36 sets a communication parameter via the interface mon.wlan0, provided by the guest OS 31.

The device driver 21 of the host OS 20 controls the wireless communication unit 13. Specifically, in response to a request from the guest OS 31 for opening a communication channel, the device driver 21 forms a buffer 25 corresponding to a communication channel to be initiated, and causes the wireless communication unit 13 to initiate a communication channel. In the above, when the wireless communication unit 13 has already carried out communication via at least one communication channel, the device driver 21 starts additional communication via that initiated communication channel, using a predetermined multiplex communication method (e.g., time division multiplexing). Note that an example process by the control unit 11 will be described later in detail.

The storage unit 12 is a memory device or a disk device, and holds a program to be executed and data to be processed by the control unit 11. Note that the program may be one provided as being stored in a computer readable recording medium and copied to the storage unit 12. The storage unit 12 operates also as a working memory of the control unit 11.

The wireless communication unit 13 is, e.g., a network card having one or more wireless LAN chips. Under the control of the control unit 11, the wireless communication unit 13 multiplexes a plurality of communication channels according to a predetermined method. The wireless communication unit 13 carries out wireless communication according to a predetermined protocol, such as 802.11n or the like, via each communication channel with a terminal 2 connected thereto through those communication channels. In the case where the wireless communication unit 13 carries out communication using 802.11n, the respective communication channels can be independently set to any of the modes including Master (acting as an access point), Managed (acting as a client or station), Ad-hoc, Mesh, Repeater, and Monitor. The wireless communication unit 13 has a buffer 41 corresponding to each of the communication channels, and stores information to be exchanged with the terminal 2 via a communication channel in the buffer 41 corresponding to that communication channel.

According to one aspect of this embodiment, in response to an instruction from the host OS 20, the wireless communication unit 13 applies time division multiplexing to a plurality of communication channels using 802.11n. Note that the time division multiplexing can be realized in the manner similar to the function widely known as multiple SSID function, and therefore is not described in detail here.

The wired communication unit 14 is a network card for wired communication, and carries out communication with another device via a wired network, such as the Internet, according to an instruction input from the control unit 11.

In the following, an example process carried out by the control unit 11 will be described in detail. In an example in this embodiment, the host OS 20 executed by the control unit 11 sets different network namespaces with respect to the respective guest OSs 31 operating in the respective program executing environments 30. That is, a different IP address, a different routing table, and so forth, are set with respect to each virtual wireless communication device interface in each program executing environment 30. Then, in the host OS 20, the destination of data received by the wired communication unit 14 is referred to, and when there is a program executing environment 30 with a network namespace corresponding to the destination node set therefor, the received data is forwarded to the guest OS 31 running on that program executing environment 30.

Further, when data for transmission via the wired communication unit 14 is received from the data process module 35 operating in any program executing environment 30, the host OS 20 sends the data via the wired communication unit 14 according to the setting, such as a routing table or the like, corresponding to the program executing environment 30 from which the data has been sent.

The data process module 35 executed by the control unit 11 sets a mode for the corresponding communication channel. Further, the data process module 35 accesses via the guest OS 31 the buffer 25 corresponding to the corresponding communication channel among the plurality of buffers 25 formed in the device driver 21 of the host OS 20.

In an operation as the host OS 20, the control unit 11, in response to a request from the guest OS 31 for accessing the buffer 25, accesses the buffer 25 corresponding to the program executing environment 30 where the guest OS 31 having sent the request is operating, and writes or extracts data requested. The data extracted by the host OS 20 is forwarded to the gust OS 31 having sent the request. In this manner, each program executing environment 30 can exclusively access the buffer 25 (hereinafter referred to as a target buffer 25) corresponding to the communication channel corresponding to the program executing environment 30 among the plurality of buffers 25. That is, as a result of the above, for every program executing environment, only a program being executed in the program executing environment is allowed to communicate via a virtual wireless communication device interface provided by the program executing environment. This allows independent setting of an IP address, a routing table, and so forth.

The data process module 35 receives data stored in the target buffer 25 via the interface (wlan0 or the like) provided by the guest OS 31, and carries out a predetermined process to the received data. As an example, the data process module 35 may request the guest OS 31 to send the received data via the wired communication unit 14. Alternatively, the data process module 35 may accept data received via the wired communication unit 14 and may request the guest OS 31 to send the data via the corresponding communication channel (by writing into wlan0 or the like).

The guest OS 31 receives data to be sent via the communication channel from the user program, and requests the host OS 20 to store the data in the target buffer 25.

As described above, according to one aspect of this embodiment, a plurality of program executing environments 30 are provided with respect to each of the multiplexed wireless communication channels subjected to time division multiplexing or the like. Then, in each of the program executing environments 30, a mode is set for the corresponding communication channel, and Media Access Control for communication via the corresponding communication channel is carried out.

For example, in a certain program executing environment 30, the corresponding communication channel is set to Master (access point). In this case, the guest OS 31 being executed in this program executing environment 30 carries out a process of disconnecting a communication from a terminal 2 that does not include a designated MAC address. Further, when a signal (RTS) for requesting data transmission is received from a terminal 2, the guest OS 31 sends a signal (CTS) for allowing data transmission to one of the terminals 2 having sent the request signal, and carries out a process for getting itself always ready to receive data from one terminal 2. Meanwhile, a terminal 2 that carries out communication via the communication channel corresponding to this program executing environment 30 carries out a process according to this aspect in communication.

Meanwhile, in another program executing environment 30, the corresponding communication channel is set to Mesh. In this case, the guest OS 31 being executed in this program executing environment 30 carries out a process of forming a mesh network, e.g., a process of forming a mesh network (IEEE standard 802.11s (http://ieeexplore.ieee.org/xpl/freeabs_all.jsp?arnumber=5416357); the process is described in a document such as http://www.cndsjhu.edu/pub/papers/smesh_tocs_accepted_version.pdf).

As described above, according to one aspect of this embodiment, an independent program executing environment 30 is provided with respect to each of the multiplexed communication channels subjected to time division multiplexing, and accordingly, it is possible to carry out different communication control including different media access control in each program executing environment 30.

Therefore, even when a wired network is disconnected due to disaster and communication via the wired communication unit 14 thereby becomes disabled in an area where a wireless communication apparatus according to this embodiment is installed, an administrator can start up a new program executing environment 30 and invoke a guest OS 31 in the new program executing environment 30 for carrying out communication control corresponding to a mesh network. And also, the administrator can invoke a corresponding user program enables opening a slice for mesh network communication in, e.g., a part of the communication channel subjected to time division multiplexing.

Further, when a program executing environment 30 for executing a program including a new process for solving a hidden terminal problem is newly formed, it is possible to experiment an effect of the new process without deteriorating the communication via other communication channels.

Figure 3:
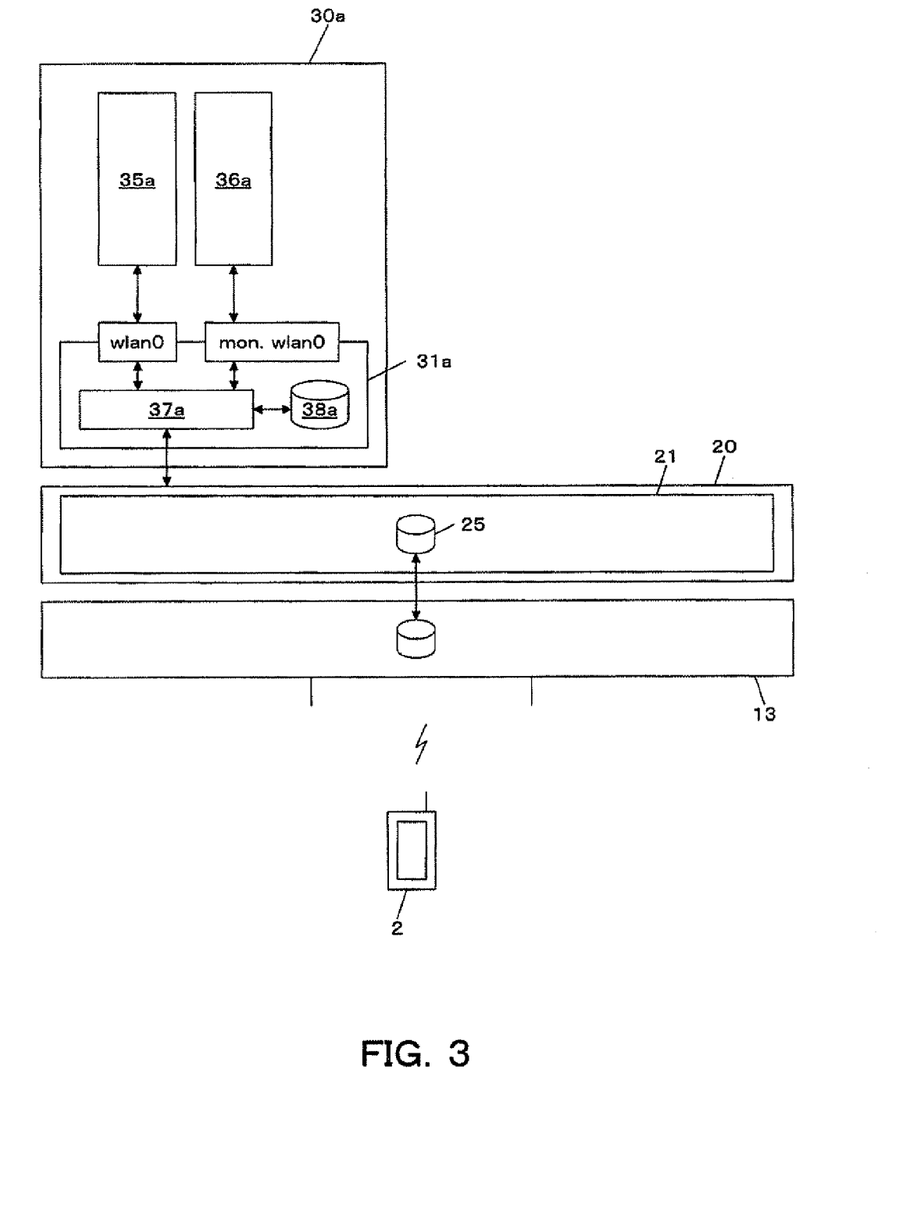
FIG. 3 is a first diagram explaining an example operation of a wireless communication apparatus according to an embodiment of the present invention.

Below, an operation of a wireless communication apparatus in this embodiment will be described referring to the drawings. FIG. 3 is a conceptual diagram showing a situation in which one communication channel is formed. A wireless communication unit 13, which is a physical layer (PHY), holds data for transmission via one communication channel, and transfers the data mutually with respect to the buffer 25 in the device driver 21 of the host OS 20. The transfer may be carried out through DMA (Direct Memory Access) without a processor or the like.

In FIG. 3, one program executing environment 30a is activated, and a guest OS 31a is operating. Further, a data process module 35a and a communication control module 36a, which are user programs, are running in the program executing environment 30a. The guest OS 31a is Linux, and provides two virtual wireless communication device interfaces, namely, wlan0 and mon.wlan0. The data process module 35a exchanges data with the module wlan0. The communication control module 36a outputs a communication parameter (ssid, or the like) via the module mon.wlan0.

In this example, the module 37a for carrying out a process for a MAC sub-layer that operates on the guest OS 31a has a buffer 38a. The module 37a transfers transmission data recorded in the buffer 38a to the host OS 20, and transfers data received from the host OC 20 to the buffer 38a.

The guest OS 31a, upon receipt of transmission data via the interface wlan0, stores the data in the buffer 38a, and upon receipt of a request to the interface wlan0 for reading received data, outputs the received data stored in the buffer 38a, via the interface wlan0.

Further, the guest OS 31a, upon receipt of a communication parameter input via the mon.wlan0, stores the communication parameter in the buffer 38a, and transfers the communication parameter to the device driver 21 of the host OS 20.

On the device driver 21 side, the communication channel is controlled such that communication is carried out based on the received communication parameter.

The host OS 20, upon receipt of the transmission data transferred form the program executing environment 30a, holds the transmission data in the buffer 25, and outputs the transmission data held in the buffer 25 at an appropriate time via the wireless communication unit 13. Further, the host OS 20 holds data received by the wireless communication unit 13 (received data) in the buffer 25, and forwards the received data held in the buffer 25 to the guest OS 31a side.

Figure 4:
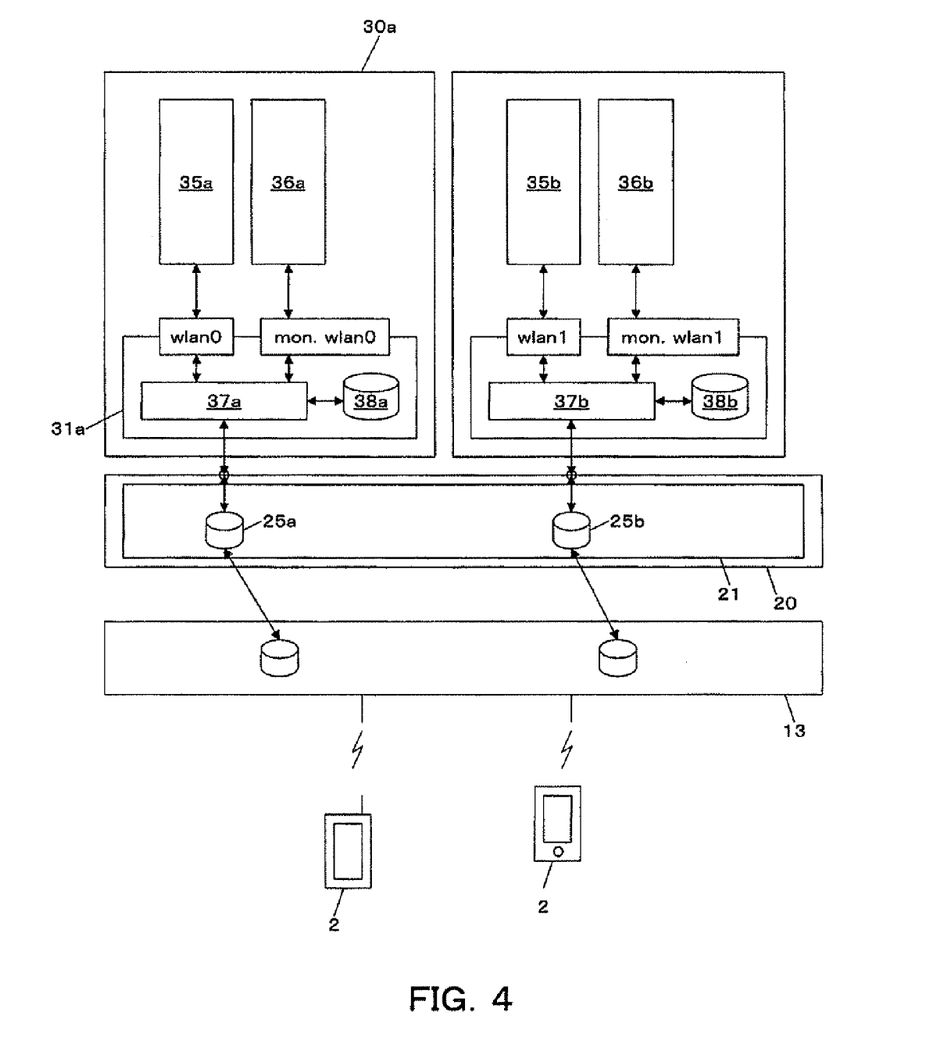
FIG. 4 is a second diagram explaining an example operation of a wireless communication apparatus according to an embodiment of the present invention.

Here, when an administrator newly activates a program executing environment 30b, a guest OS 31b is activated in the newly activated program executing environment 30b, as shown in FIG. 4. Then, in response to a request from the guest OS 31b, the device driver 21 of the guest OS 20 controls the wireless communication unit 13, and establishes a new communication channel (B) through multiplexing in addition to the existing communication channel (A). Assume here that the plurality of communication channels are subjected to time division multiplexing. Then, a buffer 25b corresponding to the new communication channel is produced. Note that, for distinction, the buffer 25 corresponding to the existing communication channel (A) is hereinafter denoted as a buffer 25a.

The communication control module 36b operating in the guest OS 31b sets a communication parameter (ssid or the like) for the corresponding communication channel (B). Note that the ssid of the communication channel (A) differs from that of the communication channel (B). The difference allows a user of the terminal 2 to select a communication channel via which to carry out communication, by designating the user's desired ssid.

In the situation shown in FIG. 4, the wireless communication unit 13 allocates two memory areas corresponding to the respective communication channels, for holding data to be sent and received via the respective communication channels. Then, the wireless communication unit 13 transfers data mutually between the buffer 25a corresponding to the communication channel (A), provided in the device driver 21 of the guest OS 20, and the memory area corresponding to the communication channel (A). Moreover, the wireless communication unit 13 transfers data mutually between the buffer 25b corresponding to the communication channel (B) and a memory area corresponding to the communication channel (B). These transfers as well may be carried out through DMA without intervention by a processor.

Each of the guest OS's 31a, 31b is Linux. The guest OS 31a provides two virtual wireless communication device interfaces, namely, wlan0 and mon.wlan0, while the guest OS 31b provides two virtual wireless communication device interfaces, namely, wlan1 and mon.wlan1.

The data process module 35a, operating on the guest OS 31a, exchanges data with the interface wlan0. The communication control module 36a outputs a communication parameter (ssid or the like) via the interface mon.wlan0.

In this example, the module 37a for carrying out a process for a MAC sub-layer that operates in the guest OS 31a has a buffer 38a. The module 37a transfers transmission data stored in the buffer 38a to the host OS 20, and transfers data received from the host OS 20 to the buffer 38a.

The guest OS 31a, upon receipt of transmission data via the virtual wireless communication device interface wlan0, stores the data in the buffer 38a, and upon receipt of a request to the virtual wireless communication device interface wlan0 for reading received data, outputs the received data stored in the buffer 38a, via the interface wlan0.

Further, the guest OS 31a, upon receipt of a communication parameter input via the mon.wlan0, stores the communication parameter in the buffer 38a, and transfers the communication parameter to the device driver 21 of the guest OS 20. On the device driver 21 side, the communication channel (A) corresponding to the program executing environment 30a is controlled such that communication is carried out based on the communication parameter received from the program executing environment 30a.

The host OS 20, upon receipt of the transmission data transferred from the program executing environment 30a, holds the transmission data in the buffer 25a, and causes the wireless communication unit 13 to send the transferred transmission data via the communication channel (A). Further, the host OS 20 holds data received by the wireless communication unit 13 (received data) via the communication channel (A) in the buffer 25a, and forwards the received data held in the buffer 25a to the guest OS 31a side of the corresponding program executing environment 30a.

Meanwhile, the data process module 35b, operating on the guest OS 31b, exchanges data with the virtual wireless communication device interface wlan1 provided by the guest OS 31b. The communication control module 36b outputs a communication parameter (ssid or the like) via the virtual wireless communication device interface mon.wlan1.

In this example, the module 37b for carrying a process for a MAC sub-layer that operates in the guest OS 31b has the buffer 38b. The module 37b transfers transmission data recorded in the buffer 38b to the host OS 20, and transfers data received from the host OS 20 to the buffer 38b.

The guest OS 31b, upon receipt of transmission data via the virtual wireless communication device interface wlan1, stores the data in the buffer 38b, and upon receipt of a request to the virtual wireless communication device interface wlan1 for reading received data, outputs the received data stored in the buffer 38b via the wlan1.

Further, the guest OS 31b, upon receipt of a communication parameter input via the mon.wlan1, stores the communication parameter in the buffer 38b, and transfers the communication parameter to the device driver 21 of the host OS 20. On the device driver 21 side, the communication channel (B) corresponding to the program executing environment 30b is controlled such that communication is carried out based on the communication parameter received from the program executing environment 30b.

The host OS 20, upon receipt of transmission data transferred from the program executing environment 30b, holds the transmission data in the buffer 25b, and causes the wireless communication unit 13 to send the transferred transmission data via the communication channel (B). Further, the host OS 20 holds data received by the wireless communication unit 13 (received data) via the communication channel (B) in the buffer 25b, and forwards the received data held in the buffer 25b to the guest OS 31b side of the corresponding program executing environment 30b.

Note that, in the above, the modules 37a, 37b may operate differently in the program environments 30a, 30b, respectively. For example, the module 37b may carry out communication according to RTS/CTS, while the module 37a may not.

Either one of the modules 37a, 37b may have a cache memory. As one example, when data received in the module 37b from the host OS 20 contains a request including HTTP, whether or not there is data stored in the cache memory so as to be correlated to the URL of the requested destination contained in the request is determined.

When there is data stored in the cache memory so as to be correlated to the URL of the requested destination, it is instructed that the data stored in the cache memory is forwarded to the data process module 35 of the host OS 20 and further to the terminal 2 having sent the request. Meanwhile, when there is no such data stored in the cache memory so as to be correlated to the URL of the requested destination, data to be sent is forwarded to the data process module 35, which further sends the data via the wired communication unit 14. The data module 35, upon receipt of response data to the request with the HTTP contained in the data via the wired communication unit 14, holds the received response data in the cache memory so as to be correlated to the information specifying the URL related to the request, received from the host OS 20 side, and instructs the host OS 20 to send the received response data to the terminal 2 having sent the request.

In this example, while the terminal 2 for carrying out communication via the communication channel (A) always receives response data via the wired communication unit 14 every time of sending a request with HTTP, the terminal 2 for carrying out communication via the communication channel (B) can receive response data corresponding to a URL having been requested in the past by another terminal 2, from the cache memory of the wireless communication apparatus 1.

That is, use of different ssid enables distinction between a terminal user that is allowed to use the cache memory and a terminal user that is not.

According to one aspect of this embodiment, due to an operation of the host OS 20, the guest OS 31 exclusively accesses the buffer 25 corresponding to itself, provided by the host OS 20, but not the buffer 25 corresponding to another guest OS 31, thus being unable to either write or read data stored therein. That is, a program operating on a certain guest OS 31*x* is able to access a virtual wireless communication device interface provided by the guest OS 31*x*, but not a virtual wireless communication device interface provided by another guest OS 31*y*. This ensures independence in communication between slices, and moreover, enables individual setting of an IP address, a routing table, and so forth, and ensures an independent name space. Further, in each slice, when an exclusively large communication data amount is resulted due to image transmission/reception or the like in communication or efficiency is deteriorated due to communication error, a coding process for improving efficiency through error detection and recovery schemes, such as Erasure Code may be carried out.

In addition, the host OS 20 may restrict functions of the guest OS 31. For example, when the module 37 of the guest OS 31 sends an instruction to set a beacon transmission interval as one transmission parameter to the host OS 20 side, the host OS 20 may determine whether or not the transmission interval related to the instruction is shorter than a predetermined threshold. When the transmission interval related to the instruction is shorter than a predetermined threshold, the host OS 20 may report the guest OS 31 of an error to prevent setting of such an interval. With the above, a process, such as beacon transmission with a too short interval, with an intention of blocking communication by another slice can be prevented.

In the above described example, an example of a user program being the data processing module 35 for sending data received by the wireless communication unit 13, via the wired communication unit 14 has been described. This embodiment, however, is not limited to the above. Instead, one of the data processing modules 35 according to another aspect of this embodiment may send character string data and image data in a beacon frame.

As one example, data to be sent by such a data process module 35 in a beacon frame may be PR information or the like including HTML data that can be shown on a web browser on the terminal 2 side. In this case, the data received on the terminal 2 side via beacon information is shown on a display or the like through interpretation of the HTML data, similar to a web browser. The HTML data may contain an instruction that instructs connection to a web site on the Internet via a different communication channel of the same wireless communication apparatus 1. Such an instruction may include ssid of the other communication channel and a URL (Y. Pu, A. Nakao, A. Shogo, Y. Tsukajima and T. Ban., "BeaconCast: Practical Information Dissemination via WiFi Beacons", IEICE Society Conference 2011, 2011).

Initially, the terminal 2 communicates with the wireless communication apparatus 1 via a communication channel capable of receiving data from the data processing module 35*a* that sends character string data and image data in a beacon frame. Note that when an exclusively large communication data amount is resulted in communication due to image transmission and reception or the like or efficiency is deteriorated due to communication error, a coding process for improving efficiency through error detection and recovery schemes such as Erasure Code may be carried out.

Then, the terminal 2 displays the received data. Thereafter, a user of the terminal 2 executes an instruction contained in the data to instruct connection to a web site on the Internet via a different communication channel. Thereupon, the terminal 2 refers to the ssid contained in the instruction, and switches the connection destination of the wireless communication so as to carry out communication via the communication channel related to the ssid referred to. Then, the terminal 2 sends a request for obtaining data from the URL contained in the instruction, via the communication channel after the switching.

In return, the wireless communication apparatus 1 causes the data process module 35*b* corresponding to the communication channel after the switching to handle the request. Specifically, the wireless communication apparatus 1 instructs the host OS 20 to cause the data processing module 35*b* to obtain data from the URL designated via the wired communication unit 14 and to send the obtained data to the terminal 2 side.

In return, the terminal 2 receives the data obtained from the designated URL, and shows a web page or the like based on the data.

While the present invention is described in terms of preferred or exemplary embodiments, it is not limited hereto.

What is claimed is:

1. A wireless communication apparatus, comprising:
   a wireless communication device for multiplexing communication channels according to a predetermined method for carrying out wireless communication with a terminal, and carrying out communication with the terminal; and
   a control device for providing a plurality of program executing environments corresponding to the respective communication channels to operate in parallel or in a multitask manner, a different routing table being set with respect to each program executing environment,
   wherein, in each of the program executing environments, a process for providing a virtual wireless communication device interface corresponding to a corresponding communication channel and for carrying out Media Access control for communication via the virtual wireless communication device interface is executed, and
   the control device causes only the program being executed in the program executing environment to carry out communication via a virtual wireless communication device interface provided by the program being executed in the program executing environment.

2. A wireless communication apparatus, comprising:
   a wireless communication device for multiplexing communication channels according to a predetermined method for carrying out wireless communication with a terminal, and carrying out communication with the terminal;
   a plurality of buffers provided to the respective communication channels, for holding data to be transmitted and received via a corresponding communication channel; and
   a control device for providing a plurality of program executing environments corresponding to the respective communication channels to operate in parallel or in a multitask manner, a different routing table being set with respect to each program executing environment, and in each of the program executing environments, for carrying out Media Access Control for communication via a communication channel corresponding to the program executing environment, exclusively accessing a buffer corresponding to the program executing environment among the plurality of buffers to process data in the buffer accessed, and carrying out a process of controlling communication via a communication channel corresponding to the buffer accessed.

3. The wireless communication apparatus according to claim 2, wherein the program executing environment is able to be additionally activated in response to an instruction by a user, and when being additionally activated, provides a new communication channel for the wireless communication device through multiplexing, forms a new buffer corresponding to the new communication channel, and causes the control device to carry out a process of exclusively accessing the new buffer formed to process data in the buffer accessed and of controlling communication via a communication channel corresponding to the buffer accessed as a process carried out in the program executing environment additionally activated.

* * * * *